United States Patent
Drewes

(10) Patent No.: US 10,088,001 B2
(45) Date of Patent: Oct. 2, 2018

(54) DRUM BRAKE

(71) Applicant: SAF-HOLLAND GmbH, Bessenbach (DE)

(72) Inventor: Olaf Drewes, Aschaffenburg (DE)

(73) Assignee: SAF-HOLLAND GmbH, Bessenbach (DE)

( * ) Notice: Subject to any disclaimer, the term of this patent is extended or adjusted under 35 U.S.C. 154(b) by 0 days.

(21) Appl. No.: 15/328,336

(22) PCT Filed: Jul. 17, 2015

(86) PCT No.: PCT/EP2015/066410
§ 371 (c)(1),
(2) Date: Jan. 23, 2017

(87) PCT Pub. No.: WO2016/012366
PCT Pub. Date: Jan. 28, 2016

(65) Prior Publication Data
US 2017/0211643 A1    Jul. 27, 2017

(30) Foreign Application Priority Data

Jul. 24, 2014 (DE) .......................... 10 2014 214 517

(51) Int. Cl.
*F16D 65/04* (2006.01)
*F16D 65/08* (2006.01)
(Continued)

(52) U.S. Cl.
CPC ............. *F16D 65/08* (2013.01); *F16D 51/20* (2013.01); *F16D 51/60* (2013.01); *F16D 69/00* (2013.01);
(Continued)

(58) Field of Classification Search
CPC ........ F16D 65/08; F16D 65/09; F16D 65/091; F16D 69/04; F16D 69/0416; F16D 51/18; F16D 51/20
See application file for complete search history.

(56) References Cited

U.S. PATENT DOCUMENTS

| | | | | |
|---|---|---|---|---|
| 2,910,145 A | * | 10/1959 | Sampson | F16D 51/52 188/251 R |
| 2,924,303 A | * | 2/1960 | Sampson | F16D 51/52 188/250 G |
| 2,987,145 A | * | 6/1961 | Sampson | F16D 51/24 188/251 R |

(Continued)

FOREIGN PATENT DOCUMENTS

| | | |
|---|---|---|
| CN | 102853003 | 1/2013 |
| DE | 1056435 | 11/1957 |

(Continued)

OTHER PUBLICATIONS

European Patent Office, International Search Report, dated Nov. 17, 2015.

*Primary Examiner* — Nicholas J Lane
(74) *Attorney, Agent, or Firm* — Price Heneveld LLP

(57) ABSTRACT

The invention relates to a drum brake, in particular for commercial vehicles, comprising a first brake shoe and a second brake shoe, wherein the first brake shoe is arranged as a leading brake shoe in the drum brake, wherein the second brake shoe is arranged as a trailing brake shoe in the drum brake, wherein at least one leading lining element can be fixed on the first brake shoe, and at least one trailing lining element can be fixed on the second brake shoe, wherein the number of leading lining elements fixed on the first brake shoe is greater than the number of trailing lining elements fixed on the second brake shoe.

25 Claims, 2 Drawing Sheets

(51) Int. Cl.
  *F16D 51/20* (2006.01)
  *F16D 69/00* (2006.01)
  *F16D 51/60* (2006.01)
  *F16D 69/04* (2006.01)
  F16D 125/30 (2012.01)
  F16D 125/66 (2012.01)

(52) U.S. Cl.
  CPC .. *F16D 69/0416* (2013.01); *F16D 2069/0433* (2013.01); *F16D 2069/0441* (2013.01); *F16D 2125/30* (2013.01); *F16D 2125/66* (2013.01)

(56) References Cited

U.S. PATENT DOCUMENTS

| | | | | |
|---|---|---|---|---|
| 3,007,549 A | * | 11/1961 | Klein | F16D 65/08 188/251 R |
| 3,013,637 A | * | 12/1961 | Sampson | F16D 65/08 188/250 R |
| 3,029,901 A | | 4/1962 | Olley | |
| 3,647,033 A | * | 3/1972 | Klein | F16D 51/20 188/251 R |
| 4,700,816 A | | 10/1987 | Rath | |
| 4,732,240 A | | 3/1988 | Flaim | |

FOREIGN PATENT DOCUMENTS

| | | |
|---|---|---|
| DE | 1087915 | 8/1960 |
| DE | 1225001 | 9/1966 |
| DE | 102011003721 | 8/2012 |
| GB | 1007804 | 10/1965 |
| GB | 2087995 | 6/1982 |
| JP | 5797934 | 6/1982 |
| SU | 804942 | 2/1981 |

* cited by examiner

DRUM BRAKE

BACKGROUND OF THE INVENTION

The present invention relates to a drum brake, in particular a drum brake for use in commercial vehicles.

Drum brakes for use in commercial vehicles are sufficiently well known from the prior art. In this case, two brake shoes arranged within a brake drum are usually spaced apart and pressed against the inside of the brake drum by a corresponding actuating device. The rotary motion of the brake drum relative to the brake shoes results in differential loading of the brake shoes coming into engagement with the brake drum. During this process, there is "self-energization" at one of the brake shoes, while the other brake shoe is pressed against the inside of the drum brake with a lower contact force. This differential loading profile also results in a differential amount of wear on the respective brake linings of the brake shoes. In the past, attempts have been made to this problem, for example, by means of brake shoe designs that differ from the outset and, in particular, by the production of a first brake shoe type, which is designed as a self-energizing brake shoe, and of a second brake shoe type, which is used as a "trailing" brake shoe. However, these different configurations of the two brake shoe types result in higher production costs. Moreover, it is not possible with the solutions known from the prior art also to retrospectively adapt the respective brake shoes to particular loading profiles or particular brake drum configurations.

In view of these problems in the prior art, the object of the present invention is to provide a drum brake in which uniform wearing of the brake linings of the drum brake can be achieved and which allows high flexibility and, as a result thereof, also retrospective adaptation of the brake shoes to the respective operating conditions. Moreover, the present invention is intended to reduce the production costs for a drum brake.

SUMMARY OF THE INVENTION

According to the invention, the drum brake comprises a first brake shoe and a second brake shoe, wherein the first brake shoe is arranged as a leading brake shoe in the drum brake, wherein the second brake shoe is arranged as a trailing brake shoe in the drum brake, wherein at least one leading lining element can be fixed, or is preferably fixed, on the first brake shoe, and at least one trailing lining element can be fixed, or is preferably fixed, on the second brake shoe, wherein the number of leading lining elements provided on the first brake shoe is greater than the number of trailing lining elements provided on the second brake shoe. The first brake shoe and the second brake shoe are preferably designed in the known manner as arc-shaped elements which can be supported or are supported pivotably at a first end within a brake drum and are subjected by an actuating unit at the second end, which lies opposite the first end, to a force which presses the respective brake shoes against the inner surface of the brake drum. In the present case, a wedge unit is preferably used as an actuating unit. As a preferred alternative, it is also possible for an S cam to be used to space the two brake shoes apart and to subject the brake shoes to a force. The first brake shoe is arranged as a leading brake shoe in the brake drum, which means that, during a braking operation, the brake drum transmits to the brake shoe a force which acts along the circumference of the curved outer side of the brake shoe or the leading lining element fixed on the brake shoe, wherein the direction of the force is away from the actuating unit and toward the support region for the pivotable support of the brake shoe. In other words, the brake drum transmits to the brake shoe a force which acts in the direction of the actuating force which the actuating unit transmits to the brake shoe. "Self-energization" thus takes place at the first brake shoe. In the context of the invention, the second brake shoe is arranged as a trailing brake shoe in the drum brake, wherein the force transmitted from the brake drum to the second brake shoe during the braking operation acts counter to the actuating force of the actuating unit. In the event that the first brake shoe and the second brake shoe are subjected to a force of equal magnitude by the actuating unit, this means that the first brake shoe is pressed more strongly against the inside of the brake drum than the second brake shoe during the braking operation. Owing to this differential contact force on the first brake shoe and the second brake shoe, there were different degrees of wear or speeds of wear on the first and the second brake shoe in conventional brakes. In the context of the present invention, it is now envisaged that the number of leading lining elements provided on the first brake shoe is greater than on the second brake shoe. This larger number of leading lining elements advantageously has the effect that the effective friction area, available on the first brake shoe, with the inside of a brake drum, is greater than the friction area available on the second brake shoe. The higher contact force of the first brake shoe is thus distributed over a larger area on the inside of the drum brake than is the case with the second brake shoe. In this way, it is advantageously possible, both at the first brake shoe and the second brake shoe, to achieve a substantially equal surface pressure between the respective lining elements arranged on the first or the second brake shoe and the inside of a brake drum. This preferably substantially equal surface pressure both at the first brake shoe and at the second brake shoe leads to substantially uniform wear on all the lining elements arranged on the respective brake shoes. In this way, it is possible to extend the servicing cycle for a drum brake since the brake linings reach the wear limit thereof at substantially the same time, both at the leading lining elements and at the trailing lining elements, and it is thus not the case that one brake lining is already worn while the brake lining arranged on the opposite brake shoe still has an adequate thickness. It is furthermore also possible in this way to reduce the use of materials in the brake linings, something that both leads to a reduction in the weight of the drum brake and is also economically and ecologically advantageous. In the present case, a lining element is preferably defined as a brake lining carrier which has engagement means for positive and/or nonpositive engagement on appropriately corresponding engagement means on the first or the second brake shoe and has a brake lining or friction lining on its outer side opposite the brake shoe. The connection between a lining element and a brake shoe is particularly preferably releasable, thereby allowing simple exchange of the lining elements once they are completely worn and allowing the replacement of old lining elements with new lining elements of substantially identical design with fresh friction linings.

In a preferred embodiment, at least one leading lining element is of identical design to a trailing lining element. Here, the identical design of the lining elements advantageously relates to the effective friction area available on the lining element for braking friction on the inside of a drum brake and to the arrangement and design of the fastening means on the lining element for fixing the lining element on a brake shoe. By means of the identical design of the lining elements, exchange or universal application of a particular type of lining element both on the first brake shoe and on the second brake shoe is particularly preferably possible. In this way, it is possible, with one and the same type of lining element, to provide a multiplicity of different configurations on the first and/or the second brake shoe and, at the same time, to enable simplified manufacture, which advantageously brings large cost savings. As a particularly preferred possibility here, one and the same machine or one and the same tool can be used to produce lining elements both for the leading lining elements and for the trailing lining elements. This simplification and standardization of the production of the lining elements results in particularly good opportunities for cost savings.

As a particularly preferred option, all the lining elements, i.e. the first and second lining elements, are formed from the same material. It is thereby possible to reduce costs during production since only a single production process is required for all the lining elements. Simply by selective arrangement of a particular number of lining elements on the brake shoe, it is thus advantageously possible to achieve the same effect as by the arrangement of lining elements of different materials.

In particular, it is possible to provide lining elements having lining areas of different sizes, which are arranged in differing numbers on the first or the second brake shoe. In this way, the braking characteristics of the two brake shoes can be adapted by virtue of the relatively large number of different combinations. Here, the provision of lining elements of different sizes creates a greater degree of freedom for the adaptation of the brake shoes to the respectively occurring loads in the brake, this being associated with increased manufacturing costs. This is potentially worthwhile since it is thus possible to match the wear on the lining elements more accurately.

The first brake shoe is furthermore preferably of identical design to the second brake shoe. Here, the identical design of the first brake shoe and of the second brake shoe relates, in particular, to the external geometry of the brake shoe, on which one or more lining elements can be fixed. Thus, the first brake shoe preferably has the same engagement means with the same geometrical arrangement as the second brake shoe, with the result that a lining element can readily be fixed both on the first brake shoe and on the second brake shoe. In this way, it is possible to simplify the production of the brake shoes since both the first brake shoe and the second brake shoe can be produced with one and the same machine or with one and the same tool and no variation in the design of the brake shoes is required.

In a preferred embodiment, the leading and trailing lining elements each have a friction area, wherein the sum of the friction areas of the leading lining elements gives a leading friction area, wherein the sum of the friction areas of the trailing lining elements gives a trailing friction area, wherein the ratio of the size of the leading friction area to that of the trailing friction area is unequal to 1, expediently from 1.5 to 4.5, preferably 2 to 4 and particularly preferably from about 2.75 to 3.25. Thus, one or a multiplicity of leading lining elements, each having a friction area, is advantageously arranged on the first brake shoe. Here, the sum of the friction areas of the leading lining elements is defined as the leading friction area. Similarly, the sum of the friction areas on the trailing lining elements is defined as the trailing friction area. In the context of the present invention, the preferred ratio range of 1.5 to 4.5 advantageously makes it possible, on the one hand, to achieve uniform wear on the trailing and the leading lining elements and, on the other hand, to avoid making the installation space requirement for the drum brake excessive. In particular, a situation is avoided where, in the case of a ratio of greater than 4.5 and a drum brake of relatively large construction, only a relatively small total friction area of all the lining elements in the drum brake would be available. The smaller the ratio of the leading friction area to the trailing friction area, the smaller is the proportion of the self-energization at the leading friction area which can be compensated for by the corresponding area ratio. The preferred range of 2 to 4 for the ratio of the leading friction area to the trailing friction area has proven suitable particularly for commercial vehicles, such as heavy goods vehicles or buses, in test series carried out by the applicant, wherein it was possible, in particular, to achieve a good compromise between the installation space required for the drum brake and, at the same time, good and uniform wear on all the lining elements in the drum brake. The particularly preferred range of about 2.75 to 3.25 of the ratio of the leading friction area to the trailing friction area can achieve particularly uniform wear on all the lining elements in the drum brake with, at the same time, optimum use of the installation space and a sufficient level of available a total maximum braking force of the drum brake, in particular, for highly loaded brakes, in which a multiplicity of lining elements of relatively small design is fixed on the first or the second brake shoe.

As a particularly preferred option, a first leading lining element having a first friction area and a second leading lining element having a second friction area, can be fixed, or preferably are fixed, on the first brake shoe, wherein the sizes of the first and second friction area are different, wherein the ratio of the second friction area to the first friction area is expediently from 0.1 to 0.8, preferably from 0.25 to 0.75 and particularly preferably from about 0.45 to 0.55. Particularly in order to increase the variability of the design of the first brake shoe and of the second brake shoe, it is preferred that lining elements of different sizes or with different friction areas can be used, particularly on the first brake shoe. In this way, it is possible, in particular, to achieve the odd-numbered friction area ratios between the leading friction area and the trailing friction area. It has been found here that it is possible, in particular, to use a first lining element type having a first friction area and a second lining element type having a second friction area, wherein the ratio of the friction areas of the first leading lining element and the second leading lining element should preferably be in the range of 0.1 to 0.8. Tests by the applicant have shown that, when this area ratio is chosen, a good compromise is available between simple fixing of the lining elements on the brake shoe by means of engagement elements or engagement sections of substantially identical design on the lining elements and, at the same time, high versatility in the setting of different area ratios between the first brake shoe and the second brake shoe. Here, the particularly preferred range of 0.25 to 0.75 of the second friction area to the first friction area has proven suitable, in particular, for the mass production of drum brakes since, in this way, it is a simple matter for the designer of a drum brake to set a particular friction area ratio of the leading friction area to the trailing friction area by selecting particular numbers of trailing lining elements and leading lining elements and thus to be able perfectly to adapt the wear properties in accordance with the respective drum brake. The particularly preferred range of 0.45 to 0.55 allows particularly simple manufacture of the lining elements since a first leading lining element is preferably only approximately half as large as a second leading lining element. At the same time, it is possible that in this way the fastening positions for the first leading lining element and the second leading lining element can be chosen substantially freely by virtue of uniformly distributed engagement means provided on the respective brake shoe and that a particularly uniform distribution of the lining elements along the circumference of the brake shoe is possible.

The friction area of the trailing lining element is preferably equal to the first friction area or to the second friction area. In other words, one of the leading lining elements, respectively having the first friction area or the second friction area, can be selected as a trailing lining element. In this way, it is possible, in turn, to reduce the number of different drum brake components to be produced and thus to lower manufacturing costs.

As a particularly preferred option, at least two leading lining elements are of identical design to one another. Thus, provision is preferably made for at least two of, for example, three leading lining elements arranged on the first brake shoe to be of identical design. Here, the identical design of the lining elements particularly preferably relates to the arrangement and geometry of the fastening means on the lining elements for fixing on the first brake shoe. In turn, the number of lining element variants to be produced can be reduced by means of this preferred embodiment, thereby also lowering production costs and reducing the assembly effort by virtue of the smaller number of different components.

In a particularly preferred embodiment, all the leading and trailing lining elements are of identical design to one another. In the particularly preferred case where all the leading and trailing lining elements are of identical design to one another, wherein the friction area of the lining elements is preferably equal and the lining elements have the same or identical design of their fastening means for fixing the lining elements on the brake shoe, the leading friction area in relation to the trailing friction area is established simply through the different number of lining elements on the first brake shoe and on the second brake shoe. Here, the advantage of the identical design of all the lining elements is drastically reduced production costs since it is possible simply to use one and the same type of lining element for the production of a multiplicity of different drum brakes. As another preferred option, it is also possible in this embodiment for the first brake shoe to be of identical design to the second brake shoe, thereby making the manufacture and assembly of the drum brake simpler and thus cheaper in combination with the lining elements of identical design.

In another preferred embodiment, three leading lining elements are fixed on the first brake shoe, and one trailing lining element is fixed on the second brake shoe. Tests by the applicant have shown that the combination of three leading lining elements on the first brake shoe with one trailing lining element on the second brake shoe can achieve a particularly favorable speed or rate of wear on all the lining elements, wherein almost complete wear of the lining elements can be achieved on drum brakes of commercial vehicles, thereby ensuring, in particular, that no brake lining is wasted due to premature replacement. In this way, the operating costs of a commercial vehicle fitted with a drum brake according to the invention can be significantly reduced.

It is advantageous if the lining elements each have a fastening section for fixing on the first brake shoe or the second brake shoe, wherein the fastening sections of the lining elements are preferably of identical design. In the present case, the fastening section of a lining element is preferably an arrangement of holes, into which riveting elements, for example, can be inserted or, preferably, projections formed on the lining elements, which engage positively in corresponding engagement geometries on the brake shoe and can be fixed positively and/or nonpositively on the brake shoe, are defined. By virtue of the identical design and arrangement of the fastening section on a lining element, the lining element can preferably be arranged in different installation positions on the brake shoe, which preferably likewise has engagement geometries arranged in an identical manner or in a repeating pattern. As a further preferred embodiment for the fastening sections, it is also possible, for example, to employ undercut geometries, such as a dovetail design of the fastening section of the lining element, which engages in an appropriately corresponding recess in the outer region of the brake shoe. As a particularly preferred option, the fastening sections of the lining elements are designed to ensure that the fixing of the lining element on the brake shoe is releasable without the need to damage relatively large parts of the brake shoe or of the lining element for this purpose.

BRIEF DESCRIPTION OF THE DRAWINGS

Further advantages and features of the present invention will become apparent from the following description of preferred embodiments with reference to the attached figures. It goes without saying that individual embodiments shown in the respective figures can have features which may also be used in other embodiments, even if this is not explicitly mentioned, and to the extent that this has not been excluded on the basis of technical circumstances or in an explicit manner. Of the figures.

DETAILED DESCRIPTION OF THE PREFERRED EMBODIMENTS

Figure 1:
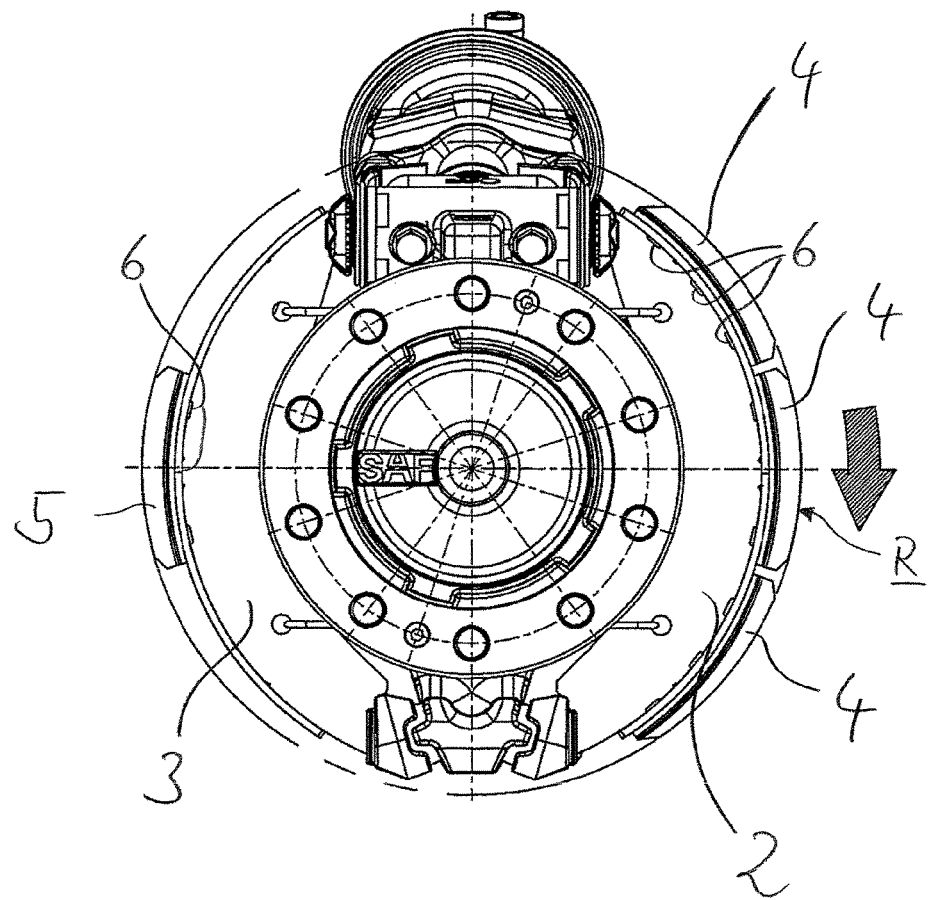
FIG. 1 shows a view of a preferred embodiment of a drum brake according to the invention.

In the preferred embodiment of the drum brake, which is shown in FIG. 1, a first brake shoe 2 and a second brake shoe 3 are supported pivotably on the brake carrier at the respective lower end of the brake shoe in a manner conventional for drum brakes, wherein a respective actuating unit (without a reference sign) engages on the brake shoes 2, 3 on the side of the brake shoes 2, 3 which is shown at the top in the figures in order to subject said shoes to a force. In the example under consideration, the actuating unit is preferably designed as a wedge unit. The brake drum is indicated schematically as a simple-dotted line around the brake shoes, wherein the hatched arrow shown on the right-hand side of the figure illustrates the direction of rotation of the brake drum relative to the brake shoes 2, 3. The first brake shoe 2 shown on the right in the figure is thus arranged as a leading brake shoe in the drum brake, while the second brake shoe 3, which is shown on the left in the figure, is designed as a trailing brake shoe. Three leading lining elements 4 are preferably arranged on the first brake shoe 2 and in each case fixed on the first brake shoe 2 by means of a preferred fastening section 6. Preferably, just one trailing lining element 5 is fixed on the second brake shoe 3, likewise by means of a fastening section 6. It goes without saying that, in the context of the present invention, the combination of different numbers of leading lining elements 4 and trailing lining elements can be provided in order to set a particular ratio of the sum of the friction areas of the trailing lining elements 5 to the sum of the friction areas of the leading lining elements 4. Each of the lining elements 4, 5 has a friction area R which in each case comes into frictional contact with the schematically indicated brake drum when the vehicle is braked by the drum brake. By appropriate distribution of lining elements as leading lining elements 4 and trailing lining elements 5 on the first brake shoe and the second brake shoe 3, it is thus possible to set a particular area ratio of the available total friction area on the first brake shoe 2 in relation to the second brake shoe 3. By means of these different total friction areas, it is possible to set a uniform surface pressure, i.e. force per unit area, on all the lining elements 4, 5 provided in the drum brake, even when self-energization occurs at the first brake shoe 2, as a result of which, in particular, the wear on the lining elements 4, 5 takes place uniformly and hence all the lining elements 4, 5 reach the end of their service life at the same time.

Figure 2:
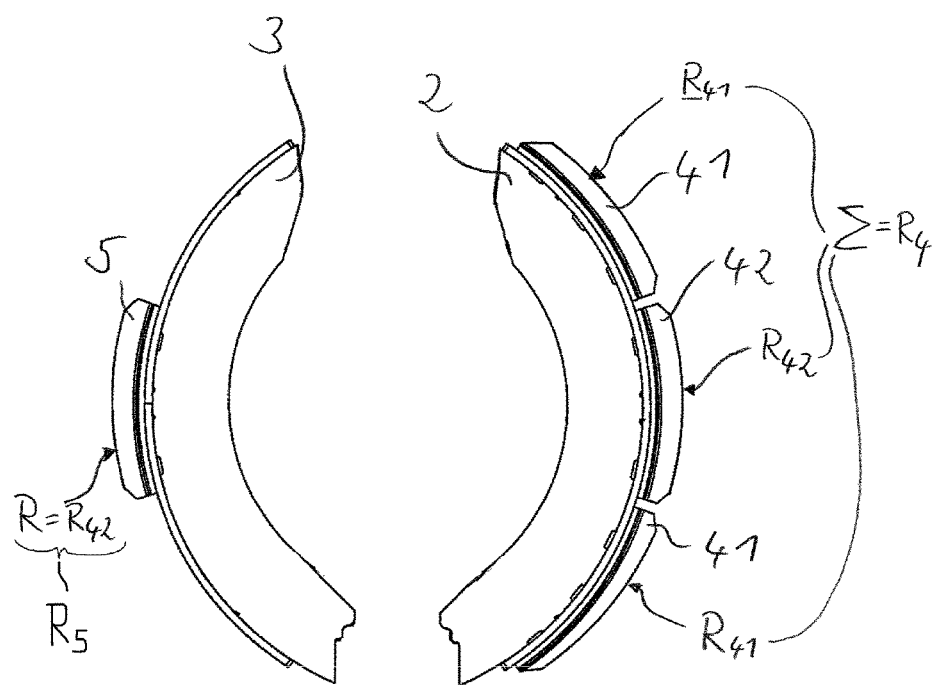
FIG. 2 shows a view of another preferred embodiment of the brake shoes of a drum brake according to the invention.

FIG. 2 shows another preferred embodiment of the first brake shoe 2 and of the second brake shoe 3 for the formation of a drum brake in accordance with the present invention. Here, three leading lining elements 4 are once again provided on the first brake shoe 2 but, in contrast to the embodiment illustrated in FIG. 1, the leading lining elements 4 are of different sizes. Thus, in particular, a first leading lining element 41 is provided, which has a first friction area $R_{41}$. Provided centrally on the first brake shoe 2 is a second leading lining element, which has a second friction area $R_{42}$. As a particularly preferred option, the trailing lining element 5 on the second brake shoe 3 is provided with the same friction area R as the second leading lining element 42. As a particularly preferred option, the second friction area $R_{42}$ is made smaller than the first friction area $R_{41}$ in order, in particular through the arrangement of not just one trailing lining element 5 but of a multiplicity of trailing lining elements 5, to achieve a particular area ratio of the leading friction area $R_4$ to the trailing friction area $R_5$. Admittedly, the use of lining elements 4, 5 of different design leads to a somewhat higher outlay on manufacture than the use of standardized lining elements 4, 5 both on the first brake shoe 2 and on the second brake shoe 3. When using lining elements 4, 5 of different design, however, it is possible to achieve greater variability in the drum brake, in which it is possible to set particular area ratios of the leading friction area $R_4$ to the trailing friction area $R_5$ within small intervals. With this preferred embodiment of the invention, uniform speeds of wear can be established at all the lining elements 4, 5 arranged in the drum brake, thereby allowing better adaptation of the drum brake to the respective conditions of use.

REFERENCE SIGNS

2—first brake shoe
3—second brake shoe
4—leading lining element
5—trailing lining element
6—fastening section
R—friction area
$R_4$—leading friction area
$R_5$—trailing friction area
$R_{41}$—first friction area
$R_{42}$—second friction area

The invention claimed is:

1. A drum brake for a commercial vehicle, comprising:
a first brake shoe;
a second brake shoe, wherein the first brake shoe is arranged as a leading brake shoe in the drum brake, and the second brake shoe is arranged as a trailing brake shoe in the drum brake;
at least one leading lining element configured to be fixed on the first brake shoe; and
at least one trailing lining element configured be fixed on the second brake shoe, wherein the number of leading lining elements fixed on the first brake shoe is greater than the number of trailing lining elements fixed on the second brake shoe;
wherein a first leading lining element of the at least one leading line element includes a first friction area and a second leading lining element of the at least one leading line element includes a second friction area configured to be fixed on the first brake shoe;
wherein the sizes of the first friction area and the second friction area are different from one another;
wherein all the lining elements of the at least one leading line element and the at least one trailing lining element are formed from the same material; and
wherein the at least one leading lining element and the at least one trailing lining element each have a friction area, wherein a sum of the friction areas of the leading lining elements of the at least one leading lining elements gives a leading friction area, wherein a sum of the friction areas of the trailing lining elements of the at least one leading lining elements gives a trailing friction area, and wherein a ratio of the leading friction area to the trailing friction area is from 1.5 to 4.5.

2. The drum brake as claimed in claim 1, wherein at least one of at least one leading lining element is identical to at least one of the at least one trailing lining element.

3. The drum brake as claimed in claim 1, wherein the ratio of the leading friction area to the trailing friction area is from 2 to 4.

4. The drum brake as claimed in claim 3, wherein the ratio of the leading friction area to the trailing friction area is from 2.75 to 3.25.

5. The drum brake as claimed in claim 1, wherein the first brake shoe is identical to the second brake shoe.

6. The drum brake as claimed in claim 5, wherein the ratio of the second friction area to the first friction area is from 0.25 to 0.75.

7. The drum brake as claimed in claim 6, wherein the ratio of the second friction area to the first friction area is from 0.45 to 0.55.

8. The drum brake as claimed in claim 6, wherein the friction area of the at least one trailing lining element is equal to at least one of the first friction area and the second friction area.

9. The drum brake as claimed in claim 8, wherein at least two leading lining elements of the at least one leading lining element are identical to one another.

10. The drum brake as claimed in claim 9, wherein three leading lining elements of the at least one leading lining element are fixed on the first brake shoe, and wherein one trailing lining element of the at least one trailing lining element is fixed on the second brake shoe.

11. The drum brake as claimed in claim 10, wherein the lining elements each have a fastening section configured to fix each lining element on at least one of the first brake shoe and the second brake shoe, and wherein the fastening sections of the lining elements are identical.

12. The drum brake as claimed in claim 1, wherein the at least one leading lining element and the at least one trailing lining element each have a friction area; wherein a sum of the friction areas of the leading lining elements of the at least one leading lining elements gives a leading friction area, wherein a sum of the friction areas of the trailing lining elements of the at least one leading lining elements gives a trailing friction area, and wherein a ratio of the leading friction area to the trailing friction area is from 1.5 to 4.5.

13. The drum brake as claimed in claim 12, wherein the ratio of the leading friction area to the trailing friction area is from 2 to 4.

14. The drum brake as claimed in claim 13, wherein the ratio of the leading friction area to the trailing friction area is from 2.75 to 3.25.

15. The drum brake as claimed in claim 1, wherein the first brake shoe is identical to the second brake shoe.

16. The drum brake as claimed in claim 1, wherein the ratio of the second friction area to the first friction area is from 0.25 to 0.75.

17. The drum brake as claimed in claim 16, wherein the ratio of the second friction area to the first friction area is from 0.45 to 0.55.

18. The drum brake as claimed in claim 16, wherein the friction area of the at least one trailing lining element is equal to at least one of the first friction area and the second friction area.

19. The drum brake as claimed in claim 1, wherein at least two leading lining elements of the at least one leading lining element are identical to one another.

20. The drum brake as claimed in claim 1, wherein three leading lining elements of the at least one leading lining element are fixed on the first brake shoe, and wherein one trailing lining element of the at least one trailing lining element is fixed on the second brake shoe.

21. The drum brake as claimed in claim 1, wherein the lining elements each have a fastening section configured to fix each lining element on at least one of the first brake shoe and the second brake shoe, and wherein the fastening sections of the lining elements are identical.

22. A drum brake for a commercial vehicle, comprising:
a first brake shoe;
a second brake shoe, wherein the first brake shoe is arranged as a leading brake shoe in the drum brake, and the second brake shoe is arranged as a trailing brake shoe in the drum brake;
at least one leading lining element configured to be fixed on the first brake shoe; and
at least one trailing lining element configured be fixed on the second brake shoe, wherein the number of leading lining elements fixed on the first brake shoe is greater than the number of trailing lining elements fixed on the second brake shoe;
wherein a first leading lining element of the at least one leading line element includes a first friction area and a second leading lining element of the at least one leading line element includes a second friction area configured to be fixed on the first brake shoe;
wherein the sizes of the first friction area and the second friction area are different from one another;
wherein a ratio of the second friction area to the first friction area is from 0.1 to 0.8;
wherein all the lining elements of the at least one leading line element and the at least one trailing lining element are formed from the same material; and
wherein the at least one leading lining element and the at least one trailing lining element each have a friction area; wherein a sum of the friction areas of the leading lining elements of the at least one leading lining elements gives a leading friction area, wherein a sum of the friction areas of the trailing lining elements of the at least one leading lining elements gives a trailing friction area, and wherein a ratio of the leading friction area to the trailing friction area is from 1.5 to 4.5.

23. The drum brake as claimed in claim 22, wherein the ratio of the leading friction area to the trailing friction area is from 2 to 4.

24. The drum brake as claimed in claim 23, wherein the ratio of the leading friction area to the trailing friction area is from 2.75 to 3.25.

25. A drum brake for a commercial vehicle, comprising:
a first brake shoe;
a second brake shoe, wherein the first brake shoe is arranged as a leading brake shoe in the drum brake, and the second brake shoe is arranged as a trailing brake shoe in the drum brake;
at least one leading lining element configured to be fixed on the first brake shoe; and
at least one trailing lining element configured be fixed on the second brake shoe, wherein the number of leading lining elements fixed on the first brake shoe is greater than the number of trailing lining elements fixed on the second brake shoe;
wherein a first leading lining element of the at least one leading line element includes a first friction area and a second leading lining element of the at least one leading line element includes a second friction area configured to be fixed on the first brake shoe;
wherein the sizes of the first friction area and the second friction area are different from one another;
wherein a ratio of the second friction area to the first friction area is from 0.1 to 0.8;
wherein all the lining elements of the at least one leading line element and the at least one trailing lining element are formed from the same material; and
wherein at least two leading lining elements of the at least one leading lining element are identical to one another.

* * * * *